United States Patent

[11] 3,598,206

[72] Inventor Ransom J. Hennells
Plymouth, Mich.
[21] Appl. No. 809,637
[22] Filed Mar. 24, 1969
[45] Patented Aug. 10, 1971
[73] Assignee W. E. Hennells Company, Inc.
Plymouth, Mich.

[54] ADJUSTABLE SHOCK ABSORBERS
8 Claims, 4 Drawing Figs.
[52] U.S. Cl. .................................................. 188/287
[51] Int. Cl. .................................................. F16f 9/44
[50] Field of Search ........................................... 188/88.502,
88.53, 96.2, 97, 97.1

[56] References Cited
UNITED STATES PATENTS
984,377   2/1911   Kilgour ..................... 188/88.53 UX
3,446,317 5/1969   Gryglas ..................... 188/96 (.2) X
3,478,846 11/1969  Germond .................... 188/96 (.2) X Primary Examiner—George E. A. Halvosa
Attorney—Woodhams, Blanchard and Flynn ABSTRACT: An adjustable energy absorber including a housing having a ram slideably extending therefrom. The housing includes a first control sleeve which divides the housing into a pair of fluid chambers, the sleeve having an axially extending row of openings providing communication between the two chambers. A further control sleeve surrounds the first sleeve and also contains a substantially axially extending row of openings therethrough, one of the rows of openings being slightly angularly inclined relative to the other row. One of the control sleeves is rotatable to adjust the relative angular position between the control sleeves to vary the area of overlap between the two rows of openings. Imposition of a force on the ram causes the ram to force fluid from one chamber through the openings into the other chamber, the ram sequentially covering the openings as it moves axially of the housing. The amount of energy absorbed can be controlled by varying the overlap area of the two rows of openings.

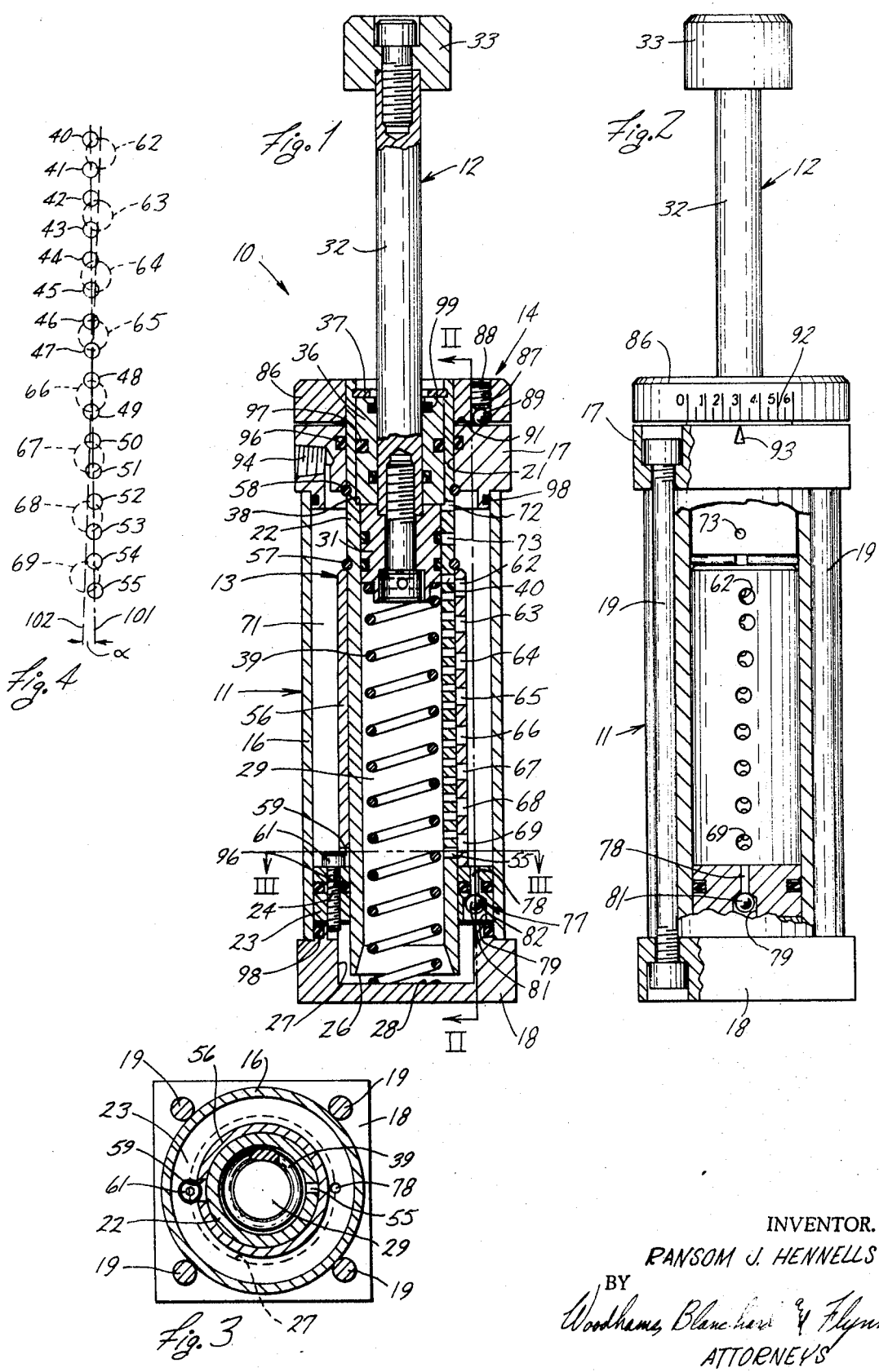

3,598,206

ADJUSTABLE SHOCK ABSORBERS

FIELD OF THE INVENTION

This invention relates generally to energy absorbers and, in particular, to an adjustable hydraulic shock absorber which is capable of being adjusted to absorb shock loads of varying amounts.

BACKGROUND OF THE INVENTION

Energy absorbers have often been customized or built in accordance with the requirements of the particular load conditions under which they were to perform. This is highly undesirable since building a separate shock absorber for each type of job is costly and time consuming. Further, customized shock absorbers are necessarily of many different sizes and there is generally no standardization among the individual components thereof, thereby making maintenance unnecessarily difficult.

To overcome the above disadvantage, several energy absorbers have been commercially manufactured which permit the energy absorbing capability thereof to be adjusted in accordance with the expected load conditions, thereby permitting the shock absorber to be utilized in different loading and environmental conditions. While many of these adjustable energy absorbers have been adaptable to a wide range of load conditions, nevertheless these energy absorbers have not been as widely utilized as the area of need for same might indicate since they have been relatively costly. Specifically, most prior-known adjustable energy absorbers have utilized a complex adjustment structure which is both expensive to manufacture and assemble and is difficult to use. Thus, the high cost of such adjustable energy absorbers, and inconvenience of use thereof, has greatly restricted the possible commercial utilization thereof.

Accordingly, it is an object of this invention to provide:
1. An improved energy absorber capable of being adjusted to absorb shock loads of varying amounts.
2. An energy absorber, as aforesaid, which is easily and precisely adjustable to vary the energy absorption characteristics thereof.
3. An energy absorber, as aforesaid, which permits the energy absorption characteristics to be precisely adjusted to a level compatible with the external loads imposed thereon.
4. An energy absorber, as aforesaid, which utilizes adjustment structure containing inner and outer concentric sleeves each having a substantially axially extending row of circular control openings, one of the rows being slightly angularly offset relative to the other row with one sleeve being rotatable to vary the overlap between the rows of openings.
5. An energy absorber, as aforesaid, which is simple and compact in construction, economical to manufacture and efficient in operation.

Other objects and purposes of this invention will be apparent to persons acquainted with apparatus of this general type upon reading the following specification and inspecting the accompanying drawings.

BRIEF DESCRIPTION OF THE DRAWINGS

FIG. 1 is a sectional elevational view of an adjustable energy absorber constructed in accordance with the principles of the present invention.

FIG. 2 is a sectional view taken along the line II–II of FIG. 1.

FIG. 3 is a sectional view taken along the line III–III of FIG. 1.

FIG. 4 is a diagrammatic illustration indicating the manner in which the two rows of flow control openings overlap.

Certain terminology will be used in the following description for convenience in reference only and will not be limiting. The words "upwardly," "downwardly," "rightwardly," and "leftwardly" will designate directions in the drawings to which reference is made. The words "inwardly" and "outwardly" will refer to the contraction and extension, respectively, of the reciprocal ram. The words "inwardly" and "outwardly" will also refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the present invention are met by providing an energy absorber having a housing which contains an adjustable sleeve means therein, which sleeve means divides the housing into a pair of fluid chambers. A ram extends from the housing and has a piston portion slideably received within one of the fluid chambers. The adjustable sleeve means includes inner and outer concentric sleeves which are relatively rotatable and each of which has a substantially axially extending row of control openings extending therethrough. The two rows of openings are adapted to overlap with the one row of openings extending at a slight angle relative to the other row. Imposition of an external force on the ram causes the piston to move axially through the one chamber to force fluid therefrom into the other chamber, the piston progressively closing off the control opening to permit the absorption of energy. The quantity of energy absorbed can be adjusted by causing relative rotation between the inner and outer control sleeves to vary the area of overlap between the two rows of openings.

DETAILED DESCRIPTION

The present invention comprises, as illustrated in FIG. 1, an energy absorber 10 which includes a conventional housing structure 11 having a ram means 12 slideably positioned within and extending therefrom. A flow control sleeve means 13 is positioned within the housing for controlling relative movement between the housing 11 and the ram means 12 due to imposition of an external load on the energy absorber 10. The quantity of energy absorbed by the device 10 can be selectively varied by an adjustment means 14 interconnected to the flow control sleeve means 13 as explained in detail below.

The housing 11 includes a hollow cylindrical sleeve 16 connected between a pair of end plates 17 and 18. The cylindrical sleeve 16 and the end plates 17 and 18 are fixedly interconnected by a plurality of bolts 19 as is conventional. The flow control sleeve means 13 includes a first cylindrical sleeve 22 positioned within the housing and extending substantially the full axial length thereof. The sleeve 22, hereinafter referred to as the inner control sleeve, is rotatably received at one end thereof within a bore 21 formed within and extending through the end plate 17. The other end of the inner control sleeve 22 is rotatably received within a bearing sleeve 23, which bearing sleeve is fixedly secured to the other end plate 18 by any conventional means, such as by a screw 24. The lower end of the inner control sleeve 22 extends through the bearing sleeve 23 and has the free end 26 thereof positioned within a recess 27 formed within the end plate 18, the free end 26 being spaced from the bottom wall 28 of the recess 27 as illustrated in FIG. 1. Further, the diameter of the inner control sleeve 22 is smaller than the internal diameter of the recess 27 to provide an annular passageway around the circumferential periphery of the free end 26.

The inner control sleeve 22 defines therein a first chamber 29 adapted to be filled with fluid. The ram means 12 includes a piston 31 snugly and slideably received within the first chamber 29, the piston 31 being fixedly connected by any conventional means to an elongated piston rod 32 which extends outwardly beyond the end plate 17 and is provided with a head portion 33 fixedly secured on the free end thereof. The piston rod 32 is snugly and slideably received within a bearing sleeve 36 positioned within the upper end of the inner control sleeve 22. The bearing sleeve 36 is axially retained within the control sleeve 22 by means of a retainer ring 37 positioned adjacent one end thereof. The other end of the bearing sleeve 36 abuts against an internal shoulder 38 formed on the control sleeve 22. A compression spring 39 is positioned within the first chamber 29 and has its opposite ends bearing against the forward face of the piston 31 and the bottom wall 28, whereby the spring 39 urges and normally maintains the ram 12 in its extended position substantially as illustrated in FIG. 1. The spring 39 thus normally maintains the piston 31 in abutting engagement with the inner end of the bearing sleeve 36.

The inner control sleeve 22 is provided with a plurality of primary openings 40—55 extending radially therethrough. The primary openings are preferably of circular cross section and are laterally spaced within a row which extends in a substantially straight line axially of the control sleeve. The primary openings are of substantially small diameter and are preferably substantially equally spaced from one another.

The flow control sleeve means 13 also includes a further cylindrical sleeve 56, hereinafter referred to as the outer control sleeve. The outer control sleeve 56 is snugly but rotatably positioned on the inner control sleeve 22 in concentric relationship therewith. The upper end of the outer control sleeve 56 abuts a retainer ring 57 which is secured to the inner control sleeve 22, while the lower end of the outer control sleeve 56 abuts against the bearing sleeve 23. A further retainer ring 58 is secured to the inner control sleeve 22 in abutting engagement with the inner control sleeve 22 in abutting engagement with the inner end of the upper end plate 17, the retainer rings 57 and 58 thus prevent axial movement of both the inner and outer control sleeves relative to one another and relative to the housing. The outer control sleeve 56 is further provided with a narrow slot 59 adjacent the lower end thereof, which slot receives therein the head 61 of the screw 24, whereby the outer control sleeve 56 is thus nonrotatably secured relative to the housing 11.

A plurality of secondary control openings 62—69 extend radially through the wall of the outer control sleeve 56, which openings are adapted to at least partially overlap the primary openings 40—55 to permit fluid communication between the first fluid chamber, as defined within the interior of the inner control sleeve 22, and a second annular fluid chamber 71, as defined between the housing sleeve 16 and the outer control sleeve 56. The secondary openings 62—69 preferably are of circular cross section and are substantially equally spaced from one another, being positioned within a substantially straight row which extends substantially axially of the outer control sleeve 56.

As illustrated in FIG. 4, the secondary openings (shown in dotted lines) are of a substantially larger diameter than the primary openings and are preferably spaced so that each secondary opening will at least partially overlap a pair of adjacent primary openings. Thus, the number of secondary openings is approximately only one-half the number of primary openings. Further, the row of secondary openings 62—69 is preferably slightly angularly offset with respect to the row of primary openings 40—55 for a purpose to be explained hereinafter. The slight angular offset between the rows of primary and secondary openings is accomplished, in the illustrated embodiment, by having the row of primary openings extend in an axial direction, whereas the row of secondary openings, while it does extend predominantly in the axial direction, has a small circumferential offset, such as a helix. In the illustrated embodiment, the row of secondary openings is offset approximately 2° from the axially extending direction of the row of primary openings.

As the ram 12 is subjected to a load so as to cause same to be compressed or moved into the housing, downward movement of the piston 31 will cause fluid to flow from the first fluid chamber 29 through the aligned primary and secondary control openings into the second fluid chamber 71. This downward movement of the piston 31 also causes the creation of a further chamber between the rearward face of the piston 31 and the inner end of the bearing sleeve 36. To prevent creation of a vacuum within his further chamber, the inner control sleeve 22 is provided with a pair of radial openings 72 and 73 extending therethrough, which openings are adapted to communicate with said fluid chamber to permit flow of fluid from said second fluid chamber 71 into said further chamber as the piston 31 is moved downwardly away from the bearing sleeve 36.

The energy absorber 10 is further provided with a check valve 77 which permits flow of fluid from the second chamber 71 to the first chamber 29 but prevents flow of fluid in the reverse direction. The check valve 77 includes a passageway 78 which extends through the bearing sleeve 23 to permit communication between the second fluid chamber 71 and the annular recess 27. The passageway 78 is provided with an enlarged portion 79 at the lower end thereof in which is received a ball valve 81, which ball valve is adapted to contact a valve seat 82 to prevent flow fluid from the recess 27 through the passageway 78 into the fluid chamber 71.

To permit the overlapping relationship of the primary and secondary openings to be varied, the energy absorber 10 is further provided with adjustment means 14 which includes an adjustably collar 86 nonrotatably secured to the inner control sleeve 22 and positioned adjacent one axial end of the housing, namely adjacent the end plate 17. The collar 86 is manually rotatable to permit a corresponding rotation of the inner control sleeve 22, which in turn causes a variation in the overlap of the primary and secondary openings since the outer control sleeve 56 is fixed. The adjustment collar 86 is further provided with a threaded opening 87 extending axially therethrough. A ball member 89 is positioned adjacent the inner end of the opening 87 in contact with the end face 91 of the end plate 17. A set screw 88 is threadedly received within the opening 87 and can be rotatably tightened to cause the ball 89 to tightly engage the end face 91, thereby fixedly securing both the adjustment collar 87 and the inner control sleeve 22 in a desired position. The adjustment collar 86 is also preferably provided with indicia 92 thereon which is adapted to cooperate with an arrow 93 provided on the end plate 17 to permit visual indication of the relative energy-absorbing characteristics of the device.

The end plate 17 is further provided with a port 94 extending therethrough in communication with the second fluid chamber 71 to permit the energy absorber 10 to be filled with fluid. During operation of the energy absorber, the port 94 either contains a suitable plug therein or is utilized to connect the energy absorber to a conventional pressurized fluid accumulation chamber.

The energy absorber 10 is further provided with resilient seal rings 96, 97, 98 and 99, such as O-rings, in a conventional manner to prevent leakage of fluid therefrom.

OPERATION

The operation of the device embodying the invention will be described in detail hereinbelow.

In an operational position, the energy absorber 10 will be described in detail hereinbelow.

In an operational position, the energy absorber 10 will generally be mounted in place by means of the lower end plate 18 so that the cylinder rod 32, being normally urged into its extended position by the spring 39, will be engageable by the apparatus from which energy is to be absorbed so as to move the cylinder rod 32 inwardly for decelerating the apparatus or absorbing shock blows therefrom. The energy absorber 10 will first be filled with fluid, such as hydraulic oil, by means of the port 94, sufficient oil being placed in the housing 11 so as to at least completely fill the first fluid chamber 29. When so prepared, the energy absorber 10 is ready for use.

With the piston rod 32 in its extended position as shown in FIG. 1, the energy absorber 10 is in a position to receive an external load or shock blow thereon. This causes the piston rod 32 to move inwardly into the housing 11, which in turn causes downward movement of the piston 31. Downward movement of piston 31 causes pressurization of the fluid contained within the first chamber 29, which fluid is forced to flow outwardly through the overlapped primary and secondary openings into the second chamber 71. As the piston 31 moves axially toward the lower end of the chamber 29, it sequentially closes of the primary openings 40—55. The number of openings providing flow communication from the chamber 29 to the chamber 71 is thus progressively decreased, which in turn progressively restricts the further flow of fluid from the chamber 29 to the chamber 71. This thus causes the piston 31 to progressively decelerate so that as the piston approaches the inner end of the chamber 29 (lower end in FIG. 1), the external shock load imposed on the energy absorbed 10 will be substantially dissipated. In the event that the load imposed on the energy absorber is not entirely dissipated by the time the piston 31 closes off the last primary opening 55, then the remaining fluid trapped between the forward face of the piston 31 and the bottom wall 28 will function as a solid stop for dissipating the remaining energy. When the inward movement of the piston has been stopped, and when the external load has been relieved from the head portion 33, the piston 31 and piston rod 32 will be returned to the original extended position due to the urging of the compression spring 39. During this return movement of the piston, the one way check valve 77 will open to permit fluid to flow from the second chamber 71 through the passage 78 into the recess 27, whereupon the fluid will then flow between the end 26 and the bottom wall 28 into the first chamber 29. The check valve 77 thus facilitates the return flow of fluid from the chamber 71 to the chamber 29 to permit a more rapid return of the ram means 13 to the extended position.

As is well understood, the deceleration rate of the ram means 13 is determined by the quantity and velocity of the fluid escaping from the inner chamber 29 through the aligned primary and secondary openings to the outer chamber 71. To adjust the deceleration rate of the ram means 13 and thereby vary the energy dissipating characteristics of the energy absorber, the setscrew 88 is loosened so as to release the locking engagement which exists between the adjustment collar 86 and the end plate 17. Adjustment collar 86 is then manually rotated, which causes a corresponding rotation of the inner control sleeve 22. Since the outer control sleeve 56 is nonrotatably secured to the housing 11, rotation of inner control sleeve 22 causes a variation in the overlapped areas of the primary and secondary control openings, thereby permitting a variation of the deceleration rate and energy dissipating characteristics of the energy absorber 10.

The deceleration rate and the energy dissipation characteristics of the energy absorber 10 of the present invention are easily and precisely adjusted as desired due to the small angular offset which exists between the rows of primary and secondary openings, which annular offset is designated by the angle $\alpha$ between the centerlines 101 and 102 of the rows of primary and secondary openings, respectively, as diagrammatically illustrated in FIG. 4. For example, if the inner control sleeve 22 is adjusted to cause the centerline 101 to intersect the centerline 102 substantially adjacent the upper end thereof (as illustrated in FIG. 4), then a maximum overlap area will exist between the secondary opening 62 and its corresponding pair of adjacent primary openings 40 and 41, whereas a minimum overlap will exist at the other end of the rows between the secondary opening 69 and its corresponding pair of primary openings 54 and 55. When positioned in this manner, the effective flow area through each pair of adjacent primary openings, as determined by the overlap thereof with the corresponding secondary opening, will thus progressively decrease in the direction of piston movement. This setting of the energy absorber will thus result in a maximum deceleration rate and in the dissipation of a maximum amount of energy.

On the other hand, if the inner control sleeve 22 is rotated to cause the centerline 101 to intersect the centerline 102 substantially adjacent the lower end thereof, then the maximum overlap will occur between the lowermost secondary opening 69 and its corresponding pair of primary openings 54 and 55, whereas the minimum overlap area will occur at the upper end of the device between the uppermost secondary opening 62 and its corresponding pair of primary openings 40 and 41. In this extreme adjustment position, the effective flow area of each pair of primary openings, as determined by the overlap thereof with the corresponding secondary opening, will progressively increase in the normal direction of piston movement. This adjustment of the energy absorber will result in a slower deceleration rate of the energy absorber will result in a slower deceleration rate of the piston and thus will result in the dissipation of lesser quantities of energy.

From the above-described operation, it will be apparent that the inner control sleeve 22 can be rotatably adjusted to any position intermediate the above two described extremes (whereby centerline 101 will intersect centerline 102 intermediate the ends thereof), which intermediate position can be selected to result in a deceleration rate of the piston most compatible with the external shock load being imposed on the energy absorber.

While the invention has been described above as having the row of primary openings extending in an axial direction and the row of secondary openings being slightly angularly offset therefrom, it will be apparent that this geometrical arrangement may be reversed so that the secondary openings are positioned in an axial row and the primary openings are slightly angularly offset therefrom. Alternately, the rows of primary and secondary openings may both be slightly angularly offset from the axial direction in opposition to one another if so desired.

Further, while the invention as described above has also disclosed the secondary openings as being larger than the primary openings so as to overlap an adjacent pair thereof, it will be apparent that this arrangement may be reversed so that the primary openings will be larger than the secondary openings and will be positioned so as to overlap an adjacent pair of secondary openings. Also, if desired, the number of secondary openings may be made substantially equal to the number of primary openings so that each secondary opening will overlap only a single primary opening. However, the two-to-one ratio between the primary and secondary openings as disclosed in the drawings is preferred since this not only minimizes the number of holes which must be formed in one of the control sleeves, but it also results in a more precise control over the magnitude of the overlap area between the primary and secondary openings when the energy absorber is being adjusted.

The embodiments of the invention in which I claim an exclusive property or privilege are defined as follows:

1. An adjustable fluid energy absorber, comprising:
   housing means including a central tubular housing member and a pair of end members positioned adjacent opposite ends of said central tubular housing member;
   sleeve means disposed in said housing means so as to form a first fluid chamber within the interior of said sleeve means and a second fluid chamber between said sleeve means and said tubular housing member;
   ram means slideably disposed on said housing means for receiving a shock load thereon, said ram means including a piston slideably disposed within one of said fluid chambers and a piston rod connected to said piston and extending outwardly from one end of said housing means;
   said sleeve means including a first sleeve member having a plurality of circular openings extending radially therethrough to permit fluid communication between said first and second chambers, said plurality of openings being arranged in a first row which extends substantially axially of said first sleeve member whereby movement of said piston axially of said one chamber causes fluid to flow from said one chamber through said openings into said other chamber;

control means for varying the effective flow area of said first row of openings to selectively vary the energy dissipation characteristics of said energy absorber, said control means including a second sleeve member disposed substantially adjacent and in concentric, rotatable relationship with said first sleeve member, said second sleeve member having a plurality of circular openings extending therethrough with said openings being positioned within a second row which extends substantially axially of said second sleeve member, the openings of said second row being adapted to at least partially overlap the openings of said first row, and said first and second rows of openings further being slightly angularly offset relative to one another; and adjustment means including a manually rotatable adjustment member disposed directly adjacent the exterior axial end face of one of said end members and fixedly interconnected to the adjacent axial end of one of said sleeve members for permitting relative rotational movement between said sleeve members for adjusting and varying the overlapped area of the openings of said first and second rows, said adjustment member being coaxial with and rotatably movable substantially about the longitudinal axis of said piston rod.

2. An adjustable fluid energy absorber, comprising:

housing means including a central tubular housing member and a pair of end members positioned adjacent opposite ends of said central tubular housing member;

sleeve means disposed in said housing means so as to form a first fluid chamber within the interior of said sleeve means and a second fluid chamber between said sleeve means and said tubular housing member;

ram means slideably disposed on said housing means for receiving a shock load thereon, said ram means including a piston slideably disposed within one of said fluid chambers and a piston rod connected to said piston and extending outwardly from one end of said housing means;

said sleeve means including a first sleeve member having a plurality of openings extending radially therethrough to permit fluid communication between said first and second chambers, said plurality of openings being arranged in a first row which extends substantially axially of said first sleeve member whereby movement of said piston axially of said one chamber causes fluid to flow from said one chamber through said openings into said other chamber;

control means for varying the effective flow area of said first row of openings to selectively vary the energy dissipation characteristics of said energy absorber, said control means including a second sleeve member disposed substantially adjacent and in concentric, rotatable relationship with said first sleeve member, said second sleeve member having a plurality of openings extending therethrough with said openings being positioned within a second row which extends substantially axially of said second sleeve member, the openings of said second row being adapted to at least partially overlap the openings of said first row, and said first and second rows of openings further being slightly angularly offset relative to one another; and adjustment means including a manually movable adjustment member disposed adjacent one axial end of said housing means and fixedly connected to the adjacent axial end of one of said sleeve members for permitting relative rotational movement between said sleeve members for adjusting and varying the overlapped area of the openings of said first and second rows, said adjustment member being disposed directly adjacent the axial end face of one of said end members in concentric and surrounding relationship to said piston rod for rotational movement relative to said rod and relative to said housing means about the longitudinal axis of said rod.

3. An energy absorber according to claim 2, wherein the individual openings in said first row are of a substantially uniform diameter, and wherein the individual openings in said second row are also of a substantially uniform diameter.

4. An energy absorber according to claim 2, further including passageway means interconnecting said first and second fluid chambers, and one-way valve means coacting with said passageway means for freely permitting flow of fluid from said other fluid chamber to said one fluid chamber while preventing fluid flow in the reverse direction.

5. An energy absorber according to claim 2, wherein said piston is slideably disposed within the first fluid chamber as defined within the interior of said first sleeve member, wherein said second sleeve member surrounds said first sleeve member, and wherein said adjustment member is fixedly secured to one axial end of said first sleeve member for rotating same relative to said housing means, said second sleeve member being fixedly secured relative to said housing means, and releasable detent means coacting between said adjustment member and said housing means for releasably maintaining said first sleeve member in a selected position.

6. An energy absorber according to claim 2, wherein the openings in said first and second rows are circular.

7. An energy absorber according to claim 6, wherein the individual openings formed in one of said rows are adapted to at least partially overlap a pair of adjacent openings formed in the other of said rows.

8. An energy absorber according to claim 7, wherein the opening in said one row are of substantially larger cross-sectional area than the openings in said other row.